UNITED STATES PATENT OFFICE.

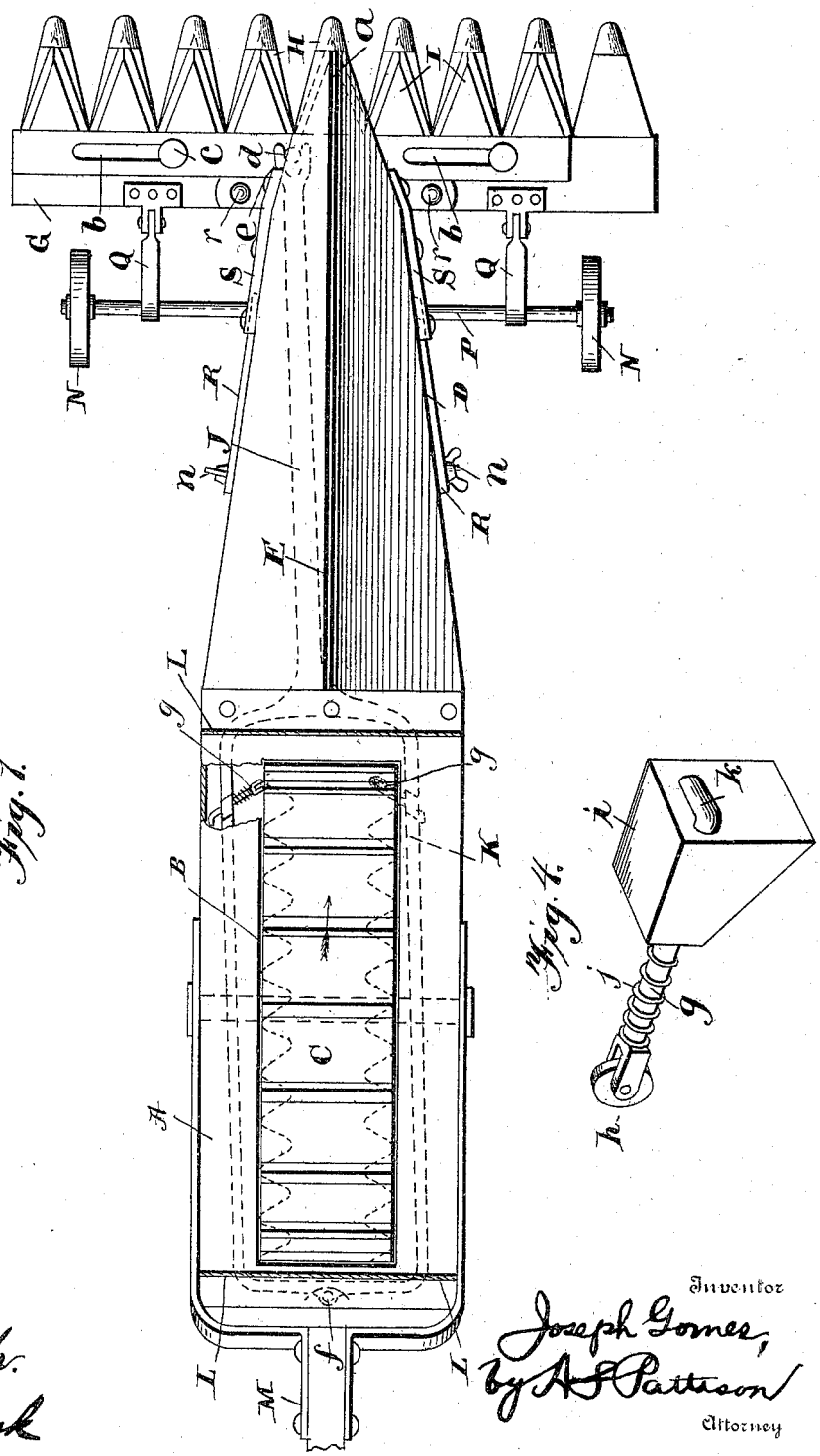

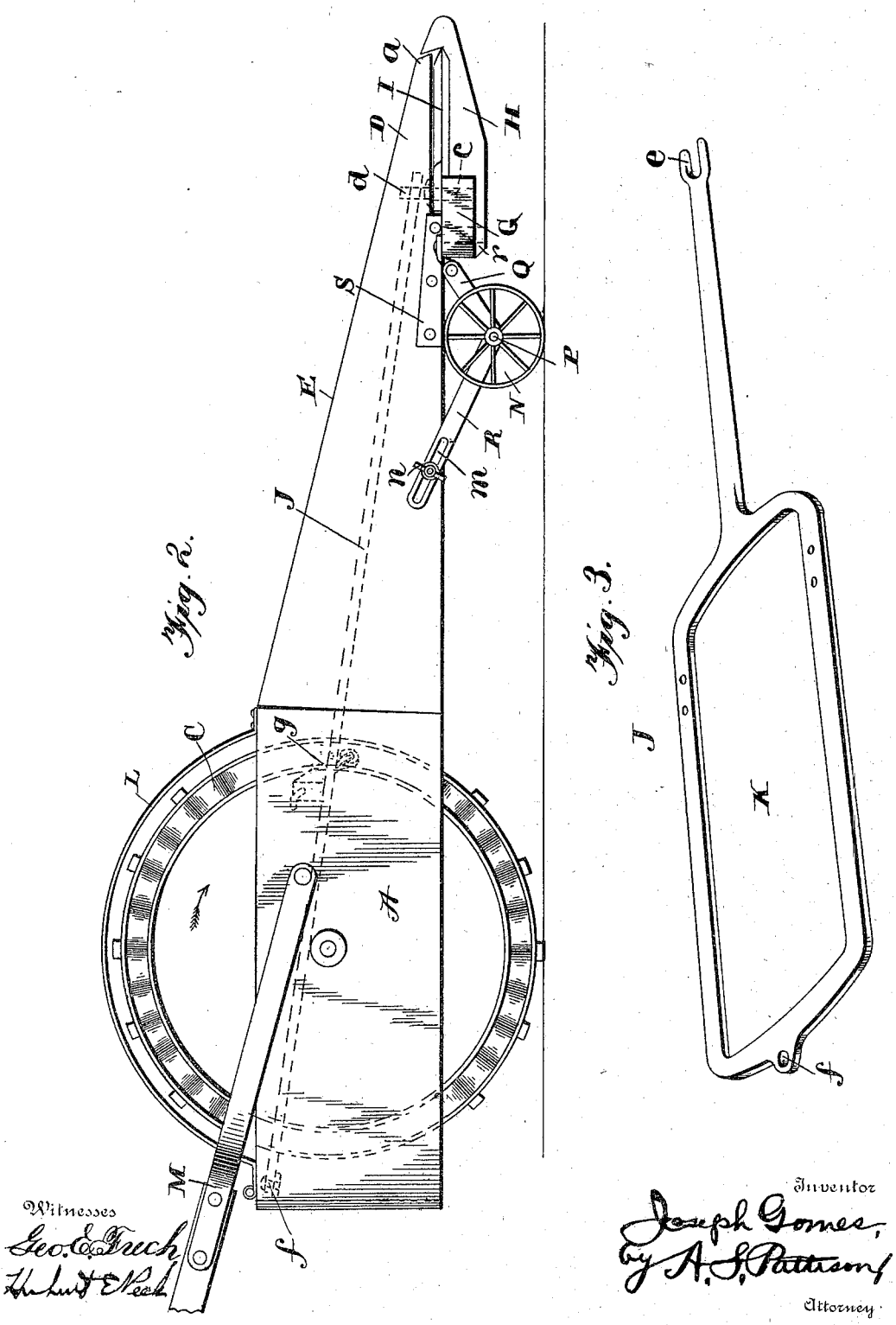

JOSEPH GOMES, OF JACKSONVILLE, ILLINOIS.

LAWN-MOWER.

SPECIFICATION forming part of Letters Patent No. 624,789, dated May 9, 1899.

Application filed June 1, 1898. Serial No. 682,275. (No model.)

*To all whom it may concern:*

Be it known that I, JOSEPH GOMES, a citizen of the United States, residing at Jacksonville, in the county of Morgan and State of Illinois, have invented new and useful Improvements in Lawn-Mowers, of which the following is a specification.

My invention relates to improvements in lawn-mowers, and pertains to a lawn-mower of that type in which a periphery of a wheel is made of a zigzag form for reciprocating a sickle-lever, all of which will be fully described hereinafter and particularly referred to in the claims.

The main object in view in my invention is to provide a lawn-mower of the type in which a driving-wheel having a zigzag periphery is provided for driving a sickle-lever and to so construct the actuating members between the wheel and lever that the machine may be run backward without reciprocating the lever.

My invention consists in the construction and arrangement of parts, which will be fully described hereinafter, and in which—

Figure 1 is a top plan view of a mower embodying my invention, the sickle lever or frame being shown in dotted lines. Fig. 2 is a side elevation of the same. Fig. 3 is an enlarged detached perspective view of the sickle lever or frame. Fig. 4 is an enlarged detached perspective view of one of the spring-actuated dogs which coöperates with the zigzag of the driving-wheel.

Referring now to the drawings, A indicates a frame, which is provided at its rear end with an opening B, in which opening a drive-wheel C is journaled. The edges of the periphery of this drive-wheel are made of a zigzag form, as shown, the projection of the zigzag upon one side being opposite the recess formed by the zigzag on the other side, whereby the wheel is adapted to actuate a sickle lever or frame, as is well understood by those skilled in the art. The frame A is made hollow and has its forward end D tapered to a point, as shown at $a$, the forward projecting portion D having the sides of its top tapered downward to form a central rib E, as clearly illustrated. Secured to this pointed forward end $a$ is a transverse bar G, to which the sickle-guard H is attached. This sickle-guard is of the usual form and coöperates with the sickle I, the sickle and the guard being provided with teeth which coöperate to cut the grass, which is also well understood by those skilled in the art. The sickle I is provided with longitudinal slots $b$, through which pass bolts or screws $c$ into the bar G and by means of which the sickle is permitted an endwise-reciprocating movement and is held in position by the said bolts or screws. This bar I passes through the forward end of the frame D and is provided with a projection or pin $d$, with which the forward fork end $e$ of the sickle lever or frame J engages. This sickle-frame J consists of a rectangular frame K, pivoted at its rear end to the rear end of the frame A at the point $f$ and surrounds the driving-wheel, as clearly illustrated. This sickle frame or lever is situated within the frame A, and is thus protected from dirt, grass, &c., its forward fork end $e$ straddling the pin $d$, as before stated, and as the sickle lever or frame is reciprocated the sickle-bar and its knives are likewise reciprocated for accomplishing the cutting action. The sickle lever or frame, as just stated, is at each side of the driving-wheel C, and this frame is provided with inwardly-extending and forwardly and downwardly extending dogs or arms $g$, provided at their outer ends with the friction-rollers $h$, and these friction-rollers engage the zigzag of the driving-wheel. These dogs or arms move endwise in a way or casing $i$, one of which is secured to each side of the sickle-frame J at the forward end of the drive-wheel. A spring $j$ surrounds these arms or dogs and serves to hold them normally downward in the position illustrated. The rear ends of these dogs have their ends turned laterally to form a head $k$, which limits the outward movement thereof within the casing or way $i$. The operation of this part of my invention is that when the mower is pushed forward and the driving-wheel revolving in the direction indicated by arrow in Figs. 1 and 2 the tendency is to draw the dog downward, and as they are held downward the zigzag of the wheel will cause the sickle-frame J to be reciprocated, as is well understood. When, however, the driving-wheel is turned backward, the spring arms or dogs $g$ will be forced upward, so that they will retract within their ways or casings and will not cause the sickle-frame to be reciprocated. By means of this construction the machine is easily operated and can be run backward and forward like the ordinary mower without operating the cutting mechanism when the machine is moved backward. By this arrangement the cutting mechanism is practically and automatically thrown out of gear when the machine is drawn backward.

For the purpose of entirely inclosing the upper portion of the drive-wheel to prevent dirt and grass getting in and interfering with the action of the dogs therewith a guard L is provided to project over the upper portion of the wheel, as clearly illustrated. The frame is provided with rearwardly-projecting handles M of any desired form, by means of which the machine is operated.

For the purpose of regulating the height of the cutting mechanism from the ground I provide the supporting rollers or wheels N, which are journaled upon a shaft P, the said shaft being journaled in the lower end of links Q, the upper ends of the links Q being pivotally connected with the rear edge of the bar G. The shaft P extends parallel to the bar G and in rear thereof, and the adjusting-arms R have their lower ends pivoted to the shaft P and their upper ends provided with a longitudinal slot $m$, through which clamping-bolt $n$ passes, there being one of these arms R at each side of the frame D, the clamping-bolts passing into the frame and by means of which the supporting-wheels N may be raised or lowered, and thereby the elevation of the cutting mechanism regulated according to the wishes of the operator, thus cutting the grass at any desired point.

An angle-plate S is secured to the under side of the forward end of the frame D, just over and in rear of the bar G, and to which the bar G is bolted through the medium of the bolts $r$.

The frame A is made of thin sheet metal of any desired thickness and is provided with any desired form of bearing for the driving-wheel B, as will be readily understood.

A machine constructed as above described is found in actual practice to be exceedingly easy to operate in its cutting action, as well as a matter of course very easy to move backward, and thus give the back-and-forth movement usually adopted for cutting lawns. A machine having the cutting-knife in front, as here shown, enables the operator to cut close to hedges and fences and in corners in a way which cannot be done with the form of mower in common use.

While I have described and shown my specific form of retracting downwardly and inwardly extending dogs for use in connection with a lawn-mower, it will be readily understood that this driving mechanism may be used in other connections without departing from that part of my invention.

Having thus described my invention, what I claim, and desire to secure by Letters Patent, is—

1. An improved mowing-machine comprising an elongated hollow body having its front end tapered to a point and a vertical oblong opening in its rear end, a drive-wheel situated in the vertical opening, a reciprocating sickle connected with the front pointed end of the hollow frame, and a sickle-bar pivoted at its rear end in rear of the drive-wheel to the said frame and its front end operatively connected with the reciprocating sickle, the said sickle-lever having inwardly-projecting arms or dogs adapted to engage the drive-wheel at a point in front of its axis, substantially as described.

2. An improved mowing-machine comprising a frame, a drive-wheel having in opposite sides thereof a zigzag outline, a sickle-lever pivoted at its rear end to the frame and its front end operatively connected with the sickle, a sickle-bar supported by the front end of the frame, and the sickle-lever provided with inwardly and downwardly projecting upwardly-retracting dogs engaging the zigzag outline of the drive-wheel at a point in front of its axis, substantially as described.

3. An improved mowing-machine comprising a frame, a reciprocating sickle carried thereby, a drive-wheel having in its opposite sides a zigzag outline, a sickle-lever pivoted at its rear end to the rear portion of the frame and its front end operatively connected with the sickle, the sickle-lever extending at opposite sides of the drive-wheel and provided with upward and outward retracting dogs engaging the said zigzag, and springs for holding the dogs normally downward, substantially as described.

4. An improved mowing-machine comprising a frame, a reciprocating sickle carried at the front end thereof, a drive-wheel at the rear end thereof having its opposite sides formed with a zigzag outline, a sickle-lever having an oblong opening in its rear end embracing the drive-wheel and pivotally connected at the rear end to the frame, the front end of the sickle-lever having a forwardly-projecting rigid arm operatively connected with the sickle, and dogs carried by the sickle-lever and adapted to engage the zigzag outline of the drive-wheel, substantially as described.

5. A driving mechanism for mowing or other machines comprising a drive-wheel having a zigzag outline in its opposite sides, a pivoted driving-lever having arms extending to opposite sides of the said wheel, and downwardly and inwardly projecting upwardly-retracting dogs engaging the zigzag outline of the opposite side of the drive-wheel, substantially as described.

In testimony whereof I have hereunto set my hand in the presence of the subscribing witnesses.

JOSEPH GOMES.

Witnesses:
J. MARSHALL MILLER,
H. W. ENGLISH,
FRANK J. HEINL.